(12) United States Patent
Bohrer

(10) Patent No.: US 9,132,612 B2
(45) Date of Patent: Sep. 15, 2015

(54) COMPOSITE PACKAGE

(71) Applicant: Graphic Packaging International, Inc., Atlanta, GA (US)

(72) Inventor: Timothy H. Bohrer, Chicago, IL (US)

(73) Assignee: Graphic Packaging International, Inc., Atlanta, GA (US)

( * ) Notice: Subject to any disclaimer, the term of this patent is extended or adjusted under 35 U.S.C. 154(b) by 6 days.

(21) Appl. No.: 13/804,058

(22) Filed: Mar. 14, 2013

(65) Prior Publication Data

US 2013/0260106 A1  Oct. 3, 2013

Related U.S. Application Data

(60) Provisional application No. 61/617,798, filed on Mar. 30, 2012.

(51) Int. Cl.
*B32B 23/04* (2006.01)
*B32B 27/32* (2006.01)
(Continued)

(52) U.S. Cl.
CPC ............. *B32B 23/046* (2013.01); *B32B 1/02* (2013.01); *B32B 3/02* (2013.01); *B32B 23/06* (2013.01); *B32B 23/08* (2013.01); *B32B 27/08* (2013.01); *B32B 27/10* (2013.01); *B32B 27/20* (2013.01); *B32B 27/32* (2013.01); *B32B 27/34* (2013.01); *B32B 27/36* (2013.01); *B65D 65/00* (2013.01); *B32B 29/00* (2013.01); *B32B 2307/306* (2013.01); *B32B 2307/31* (2013.01); *B32B 2307/50* (2013.01); *B32B 2307/7163* (2013.01); *B32B 2307/75* (2013.01); *B32B 2439/00* (2013.01); *B32B 2439/70* (2013.01); *D21H 27/10* (2013.01); *Y02W 90/11* (2015.05);
(Continued)

(58) Field of Classification Search
CPC ........ B32B 27/08; B32B 27/10; B32B 27/36; B32B 27/32; B32B 29/00; B32B 1/02; D21H 27/10
USPC ............................... 428/34.2, 34.6, 35.6, 35.7
See application file for complete search history.

(56) References Cited

U.S. PATENT DOCUMENTS 2,328,563 A  9/1943  Lichter
3,119,540 A  1/1964  Schenk et al.
(Continued)

FOREIGN PATENT DOCUMENTS

EP  2265504  12/2010
JP  09295380  11/1997
(Continued)

OTHER PUBLICATIONS

International Search Report and Written Opinion mailed Jun. 26, 2013, for related application, No. PCT/US2013/031210.
(Continued)

*Primary Examiner* — Betelhem Shewareged
(74) *Attorney, Agent, or Firm* — Womble Carlyle Sandridge & Rice, LLP

(57) ABSTRACT

A composite construct comprising a side wall extending at least partially around an interior of the composite construct. At least a portion of the side wall comprises at least one laminate, and the at least one laminate comprises at least one layer of material that comprises a first renewable polymer. The composite construct can also comprise at least one injection-molded element comprising at least a second renewable polymer.

55 Claims, 12 Drawing Sheets

(51) Int. Cl.

| | |
|---|---|
| *B32B 23/06* | (2006.01) |
| *B32B 23/08* | (2006.01) |
| *B32B 27/08* | (2006.01) |
| *B32B 27/10* | (2006.01) |
| *B32B 27/20* | (2006.01) |
| *B32B 27/34* | (2006.01) |
| *B32B 27/36* | (2006.01) |
| *B32B 1/02* | (2006.01) |
| *B32B 3/02* | (2006.01) |
| *B65D 65/00* | (2006.01) |
| *B32B 29/00* | (2006.01) |
| *D21H 27/10* | (2006.01) |

(52) U.S. Cl.
CPC ......... *Y02W90/12* (2015.05); *Y10T 428/24777* (2015.01); *Y10T 428/31978* (2015.04); *Y10T 428/31982* (2015.04)

(56) References Cited

U.S. PATENT DOCUMENTS

| | | | |
|---|---|---|---|
| 3,154,617 A | 10/1964 | Schenk et al. | |
| 3,226,008 A | 12/1965 | Chiorri | |
| 3,834,606 A | 9/1974 | Andersson | |
| 3,967,731 A | 7/1976 | Boduch | |
| 4,312,451 A | 1/1982 | Forbes et al. | |
| 4,624,380 A | 11/1986 | Wernette | |
| 4,971,201 A | 11/1990 | Sathre | |
| 5,676,276 A | 10/1997 | Zielinski et al. | |
| 6,547,127 B2 | 4/2003 | Bradford et al. | |
| 6,645,584 B1 | 11/2003 | Kuusipalo et al. | |
| 6,988,654 B2 | 1/2006 | Wnek | |
| 7,975,871 B2 | 7/2011 | Wnek et al. | |
| 8,124,201 B2 | 2/2012 | O'Hagan et al. | |
| 2002/0137421 A1* | 9/2002 | Desroches et al. | 442/411 |
| 2004/0262322 A1 | 12/2004 | Middleton et al. | |
| 2007/0194029 A1 | 8/2007 | Middleton et al. | |
| 2007/0262487 A1 | 11/2007 | O'Hagan et al. | |
| 2007/0264520 A1* | 11/2007 | Wood et al. | 428/606 |
| 2007/0267374 A1 | 11/2007 | Middleton et al. | |
| 2008/0069856 A1* | 3/2008 | Lyu et al. | 424/426 |
| 2009/0236063 A1 | 9/2009 | Onozuka et al. | |
| 2009/0250372 A1 | 10/2009 | Wnek et al. | |
| 2010/0029809 A1 | 2/2010 | Kuroda | |
| 2010/0044267 A1 | 2/2010 | Tolibas-Spurlock et al. | |
| 2010/0144932 A1 | 6/2010 | Kwon et al. | |
| 2010/0266792 A1 | 10/2010 | Pfistner et al. | |
| 2010/0308064 A1 | 12/2010 | O'Hagan et al. | |
| 2010/0314801 A1 | 12/2010 | O'Hagan et al. | |
| 2010/0320637 A1 | 12/2010 | Boldizar | |
| 2011/0012291 A1 | 1/2011 | Middleton et al. | |
| 2011/0172475 A1 | 7/2011 | Peters et al. | |
| 2011/0227250 A1 | 9/2011 | Wnek et al. | |
| 2013/0260106 A1* | 10/2013 | Bohrer | 428/192 |

FOREIGN PATENT DOCUMENTS

| | | |
|---|---|---|
| JP | 10230923 | 9/1998 |
| JP | 2008207880 | 9/2009 |
| WO | WO2009/145950 | 12/2009 |

OTHER PUBLICATIONS

"Are Natural Fiber Composites Environmentally Superior to Glass Fiber Reinforced Composites?" Composites, Part A, Applied Science and Manufacturing 35 (2004), 371-376, S.V. Joshi, et al. (Michigan State University).
"Natural Fiber-Reinforced Polymer Composites," Proc. Pakistan Acad. Sci 44(2):129-144. 2007, Saira Taz, et al.
Pretreatments of Natural Fibers and Their Application as Reinforcing Material in Polymer Composites—a Review. Polymer Engineering and Science, Jul. 1, 2009, Kalia, Susheel, et al.
"Design of a Hemp-Reinforced PET Composite I-Beam," Thesis Submitted to the Faculty of Science and Engineering of the Royal Military College of Canada, A.S. Fotso Talla, Nov. 2008, Publisher: Ottawa: Library and Archives Canada [2010].
"Completing the Puzzle: 100% Plant-Derived PET," Komula, Bioplastics Magazine, Apr. 2011, vol. 6, pp. 14-17.

* cited by examiner

COMPOSITE PACKAGE

CROSS-REFERENCE TO RELATED APPLICATIONS

This application claims the benefit of U.S. Provisional Patent Application No. 61/617,798, filed Mar. 30, 2012.

INCORPORATION BY REFERENCE

The disclosures of U.S. Provisional Patent Application No. 61/617,798, which was filed on Mar. 30, 2012, U.S. Pat. No. 8,124,201, which was issued on Feb. 28, 2012, U.S. Pat. No. 7,975,871, which was issued on Jul. 12, 2011, U.S. Patent Application Publication No. 2010/0308064, which was filed Jun. 24, 2010, U.S. Patent Application Publication No. 2010/0314801, which was filed Jun. 24, 2010, and U.S. Patent Application Publication No. 2011/0012291, which was filed Jul. 20, 2010, are hereby incorporated by reference for all purposes as if presented herein in their entirety, for all purposes.

BACKGROUND OF THE DISCLOSURE

The present disclosure generally relates to composite constructs and, more particularly, the present disclosure relates to containers with injection-molded features.

BRIEF SUMMARY OF SOME ASPECTS OF THE DISCLOSURE

In one aspect, the disclosure is generally directed to a composite construct. The composite construct comprises a side wall extending at least partially around an interior of the composite construct. At least a portion of the side wall comprises at least one laminate, and the at least one laminate comprises at least one layer of material that comprises a first renewable polymer. The composite construct can also comprise at least one injection-molded element comprising at least a second renewable polymer.

In another aspect, the disclosure is generally directed to a blank for forming a composite construct. The blank comprises at least one laminate for forming at least a sidewall of the composite construct formed from the blank. The at least one laminate comprises at least one layer of material that comprises a first renewable polymer. At least one injection-molded element comprises at least a second renewable polymer, and the at least one injection-molded element is for being combined with the substrate for forming the composite construct from the blank.

In another aspect, the disclosure is generally directed to a composite construct. The composite construct comprises a side wall extending at least partially around an interior of the composite construct. At least a portion of the side wall comprises at least one laminate, and the at least one laminate comprises at least one layer of material that comprises a first polymer. The composite construct can also comprise at least one injection-molded element comprising at least a second polymer. At least one of the first polymer and the second polymer is a renewable polymer, and at least one of the first polymer and the second polymer is an at least partially degradable polymer.

Other aspects, features, and details of the present disclosure can be more completely understood by reference to the following detailed description of exemplary embodiment taken in conjunction with the drawings and from the appended claims.

BRIEF DESCRIPTION OF THE DRAWINGS

Those skilled in the art will appreciate the above stated advantages and other advantages and benefits of various additional embodiments reading the following detailed description of the exemplary embodiments with reference to the below-listed drawing figures. Further, the various features of the drawings discussed below are not necessarily drawn to scale. Dimensions of various features and elements in the drawings may be expanded or reduced to more clearly illustrate the exemplary embodiments of the disclosure.

Corresponding parts are designated by corresponding reference numbers throughout the drawings.

DETAILED DESCRIPTION OF EXEMPLARY EMBODIMENTS

Figure 1:
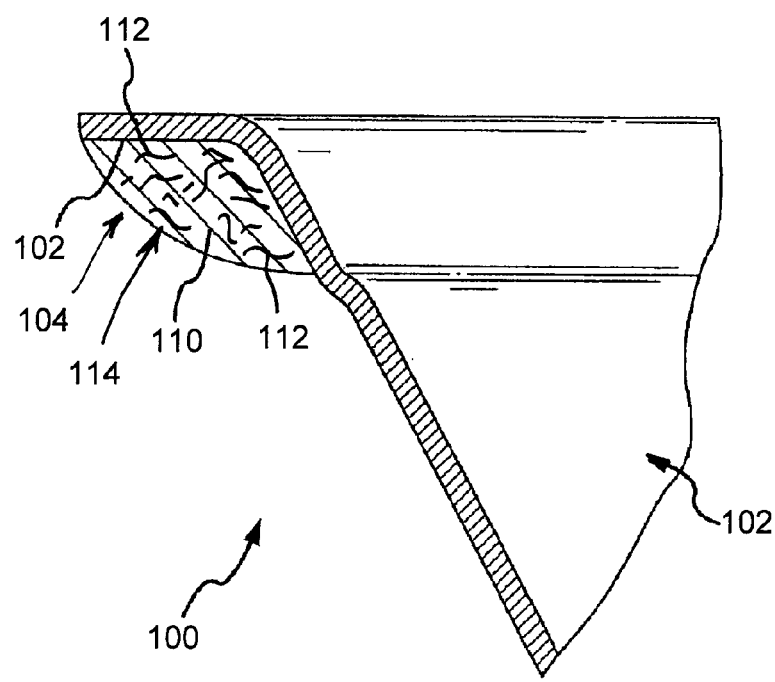
FIG. 1 is a perspective partial cross-sectional view of an exemplary composite construct according to the present disclosure.

The present disclosure generally relates to a construct (e.g., a container, package, sleeve, tray, or other constructs) with a composite structure. For example, a composite construct can include a laminate in conjunction with injection-molded polymer elements. The construct, for example, can be used for holding, storing, freezing, heating, cooking, etc. food products or other products. In one example, a composite construct can be configured for holding a food product while heating in a microwave oven, a conventional oven, or both (e.g., dual oven heating), for hermetic sealing (e.g., extended life modified atmosphere packaging), and/or for refrigeration/freezing storage. Additionally, a composite construct can include microwave packaging elements (e.g., a microwave susceptor element) and/or seals configured to automatically vent during heating or transportation at high altitude. Other uses and styles of composite constructs are also included in the present disclosure.

In one embodiment, a composite construct can include from at least two elements to any reasonable number of elements comprising different materials or different forms of substantially the same material (e.g., a sheet or film and an injection-molded element). The materials themselves can be a simple or non-composite material (e.g., a standalone polymer) or a composite material (e.g., a laminate including a substrate and a coating, for example, and/or a fiber-filled polymer). For the purpose of this disclosure, a composite construct, package, container, etc. comprises two or more elements (e.g., a laminate element in conjunction with an injection-molded element) regardless of whether the materials of the different elements are composite materials or simple materials. In the present embodiment, the materials of the elements of the composite construct can include renewable materials, natural fibers, and/or degradable materials. For example, renewable materials could be at least partially derived from biological processes or other processes wherein the supply can be replenished in a reasonable time period, which can include annually-renewable plant sources, plant sources that can be renewed in years or decades, algae, bacteria, or any other suitable source. In one example, a reasonable time period for at least partially replenishing a resource can be within an average person's lifetime. A polymer that is derived solely from fossil-based petrochemicals might not be considered a bio-derived polymer, for example; however, some substances that are similar to petrochemicals (e.g., petrochemical analogues) can be produced at least partially by microbes and/or other biological sources or by chemically reacting or modifying bio-sourced materials, for example, and these at least partially bio-derived petrochemical analogues can be used to produce at least partially bio-derived polymers. A natural fiber can be any at least partially naturally-occurring fiber, such as those derived from plants (e.g., wood fibers, cotton, hemp, jute, flax, coir, bamboo, sugarcane, rice husks, banana fiber, ramie, sisal, and other plants). A degradable material (e.g., polylactide-based polymers) could be an at least partially compostable, biodegradable material, and/or other materials that can at least partially break down into small parts that are relatively harmless to the environment and/or into nutrients (e.g., for beneficial plants and/or bacteria) in a reasonable amount of time.

According to one embodiment, renewable and/or degradable materials can include at least partially bio-based polymers, polymers that are at least partially formed from chemicals that are output by or extracted from biological organisms (e.g., plants, algae, bacteria, animals), paper products, and other materials. Paperboard and other paper products are often recognized as inherently sustainable or renewable materials as the trees and other plants that provide raw materials for the paper products can be and are routinely replanted in a sustainably renewable fashion. In one embodiment, the renewable and/or degradable material can be processed in injection molding applications, can be bonded or otherwise applied to a substrate (e.g., a blank or a pressed tray), has sealing, barrier, and/or venting properties, and/or has temperature resistance for heating (e.g., microwave and/or conventional oven) and/or for refrigeration/freezing or other storage. Other renewable and/or degradable materials can also be used without departing from the present disclosure.

Cellulose is a naturally-occurring polymer from trees and other plants that can be used as a renewable polymer on its own or that can be used as a feedstock source for polymerization into polymers with different characteristics than cellulose. Polylactide-based polymers (polylactic acid; poly (lactic acid); PLA) can be derived from plants and can be used in extrusion applications (e.g., film manufacturing, laminating, coating, injection molding, etc.), for example. In one example, Kareline® PLMS6040 (manufactured by Kareline Oy Ltd.) is a commercial wood fiber filled PLA for injection molding applications. Other polymers that can be renewable (e.g., at least partially bio-derived) and/or degradable include polyesters (e.g., polyethylene terephthalate (PET), polyethylene naphthalate (PEN), PCTA), polypropylenes, nylons, polyethylenes (including LDPE, LLDPE, MDPE, HDPE and copolymers and blends), and other polymers. Additional renewable and/or degradable materials can include chitin-based polymers (e.g., from shellfish and the like) and materials formed from methane, wherein the methane is recovered directly from biological sources (e.g., cattle). Renewable materials, degradable materials, and natural fibers are under development and/or will be under development, and new materials can be included in the disclosure.

The materials of the composite construct can be any renewable and/or degradable material with suitable properties for the particular type of construct. For example, a composite construct that is a tray or other container for heating a food product can comprise renewable materials with a temperature resistance of at least about 165 degrees Fahrenheit since it is often recommended to heat many food products to at least this temperature. Applications with lower temperature resistance requirements can include, for example, non-food heating, heating beverages, reheating some food items, applications that only require storage and/or cooling, and others. Some applications can have higher temperature resistance requirements, such as for food products that require a higher external temperature in order to reach a minimum internal temperature, and/or for heating food products at least partially in a conventional oven, which can be set at higher temperatures for heating a food product via conduction and/or convection. In an exemplary embodiment, varieties of polylactide-based polymers are at least partially bio-derived polymers with temperature resistances between about 100 degrees Fahrenheit and about 200 degrees Fahrenheit. Accordingly, some varieties of polylactide-based polymers can be used for heating products such as by adding hot water (e.g., beverages, soups), heating products in a microwave oven, and other limited heating applications. Additionally, polylactide-based polymers can be developed to have higher temperature resistances for higher temperature heating through additives (e.g., at least partially bio-derived fibers and other additives). Higher temperature polymers are also included in this disclosure and may allow heating in a conventional oven. Polyesters, polypropylenes, nylons, and other polymers at least partially based on bio-derived feedstocks can have sufficient temperature resistances for heating food products in microwave ovens and/or conventional ovens. Other considerations for selecting a suitable material can include material strength for supporting the weight of a product and/or for stacking, and the permeability or impermeability of the material to certain gases, liquids, and/or other flowable materials (e.g., oils, oxygen, water, etc.).

EXAMPLES

Figure 1A:
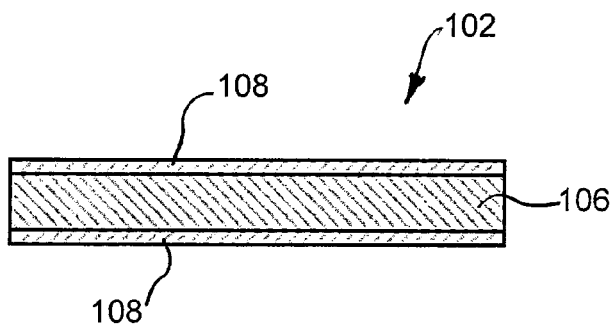
FIG. 1A is a cross-sectional view of a portion of a laminate of the exemplary composite construct of FIG. 1.

The present disclosure can be more specifically described by the following examples; however, the present disclosure is not limited to these examples. For the purposes of these examples, FIG. 1 shows an exemplary section 100 of a composite construct comprising a laminate 102 and an injection-molded element 104. As illustrated in FIG. 1A, the laminate 102 can include a substrate 106 and one or more coatings or films 108 applied to the substrate 106 by extrusion coating, extrusion lamination, film lamination, adhesive bonding, thermal bonding, spraying, roll coating, or any other chemical or mechanical means, or other suitable methods. The film 108 can be applied to one or both sides of the substrate 106, for example. Alternatively, the laminate 102 can be multiple layers of material or a single layer of material. The laminate can optionally include a microwave interactive element as a layer and/or embedded in another layer. Additionally, different materials and/or application methods can be used to form one or more layers on different sides of the substrate 106, or one or more layers of material can be applied to one side of the substrate 106 and not the other. In one example, a microwave interactive element can be applied to one side of the substrate 106 and a moisture barrier layer can be applied to the other side of the substrate 106.

As shown in FIG. 1, the injection-molded element 104 can include a polymer 110 with reinforcing fibers 112 (collectively: a filled polymer 114). The reinforcing fibers 112 can be included to strengthen the injection-molded element 104 and/or to help reduce shrinking of the polymer 110 during cooling after an injection molding process. Alternatively, the reinforcing fibers 112 can be omitted from the injection-molded element 104. The injection-molded element 104 can be formed in a mold wherein the laminate 102 is positioned in the mold adjacent one or more cavities and/or channels for forming the injection-molded element.

The section 100 of the composite construct is included as an example only. The present disclosure is not limited to the shapes of the laminate 102 and the injection-molded structure 104. For example, the laminate 102 can be a tray, a lid, a sleeve, and/or another container formed from a blank; a blank for being formed into a tray, a lid, a sleeve, and/or another container; and/or a pressed or preformed tray, lid, sleeve, and/or other container. The injection-molded element 104 can be, for example, part of a molded rim, spline, and/or another structural feature. Additionally, the polymers, natural fibers, and other materials are included by way of example only.

Example 1

The laminate 102 comprises a paperboard substrate 106 laminated with a cellulose film 108 on one or both sides of the paperboard substrate 106. The injection-molded element 104 can comprise any suitable bio-derived polymer 110—or partially bio-derived polymer—with natural fibers 112 to form the filled polymer 114. One or more suitable adhesion-promoting treatments can be applied to the cellulose film 108 where the film is contacted by the molten filled polymer 114 to help secure the injection-molded element 104 to the laminate 102.

Example 2

The laminate 102 comprises a paperboard substrate 106 and a fully or partially bio-based nylon (e.g., nylon 6 or nylon 6,6) layer 108. The paperboard substrate 106 can be coated on one or both sides with the fully or partially bio-based nylon or the fully or partially bio-based nylon can be formed into a film and laminated onto the paperboard substrate 106, for example. The injection-molded element 104 comprises fully or partially bio-based nylon (e.g., nylon 6 or nylon 6,6) 110 filled with natural fiber 112 to form the filled polymer 114.

Example 3

The laminate 102 comprises a paperboard substrate 106 and a fully or partially bio-based polyester (e.g., PET) layer 108. The paperboard substrate 106 can be coated on one or both sides with the fully or partially bio-based polyester or the fully or partially bio-based polyester can be formed into a film and laminated onto the paperboard substrate 106, for example. The injection-molded element 104 comprises fully or partially bio-based polyester 110 filled with natural fiber 112. In one example the selected fully or partially bio-based polyester can have a temperature resistance of more than about 200 degrees Fahrenheit.

Any of the examples or any alternative composite construct comprising renewable materials can incorporate fully or partially bio-based polymers with suitable degradability characteristics so that substantially all of the composite construct will degrade under appropriate conditions. For example, the polymers can be selected to degrade in composting conditions (e.g., in industrial systems managed with heat and moisture, in home-based composting systems). In one embodiment, the composite construct includes polymers and other materials that meet standard degradability tests for composting.

According to one embodiment, the composite construct includes multiple elements, each comprising materials that are derived from up to 100 percent renewable sources and/or degradable materials. Accordingly, the composite constructs can have little or no strain on non-renewable resources and the use of renewable and/or degradable materials can be advertised to a consumer. Additionally, the present disclosure is directed to using renewable and/or degradable materials in a construct with the advantages of a composite construct, including those that use paper or paperboard for enhanced package graphics and stiffness at elevated cooking temperatures, and those that use polymers for barrier and leak prevention (e.g., as a film or coating) and reinforcement and filled package sealability (e.g., injection-molded splines and/or rims). Accordingly, renewable composite constructs can have broad possible functionalities and are less likely to require additional packaging elements than homogenous constructs.

Figure 2:
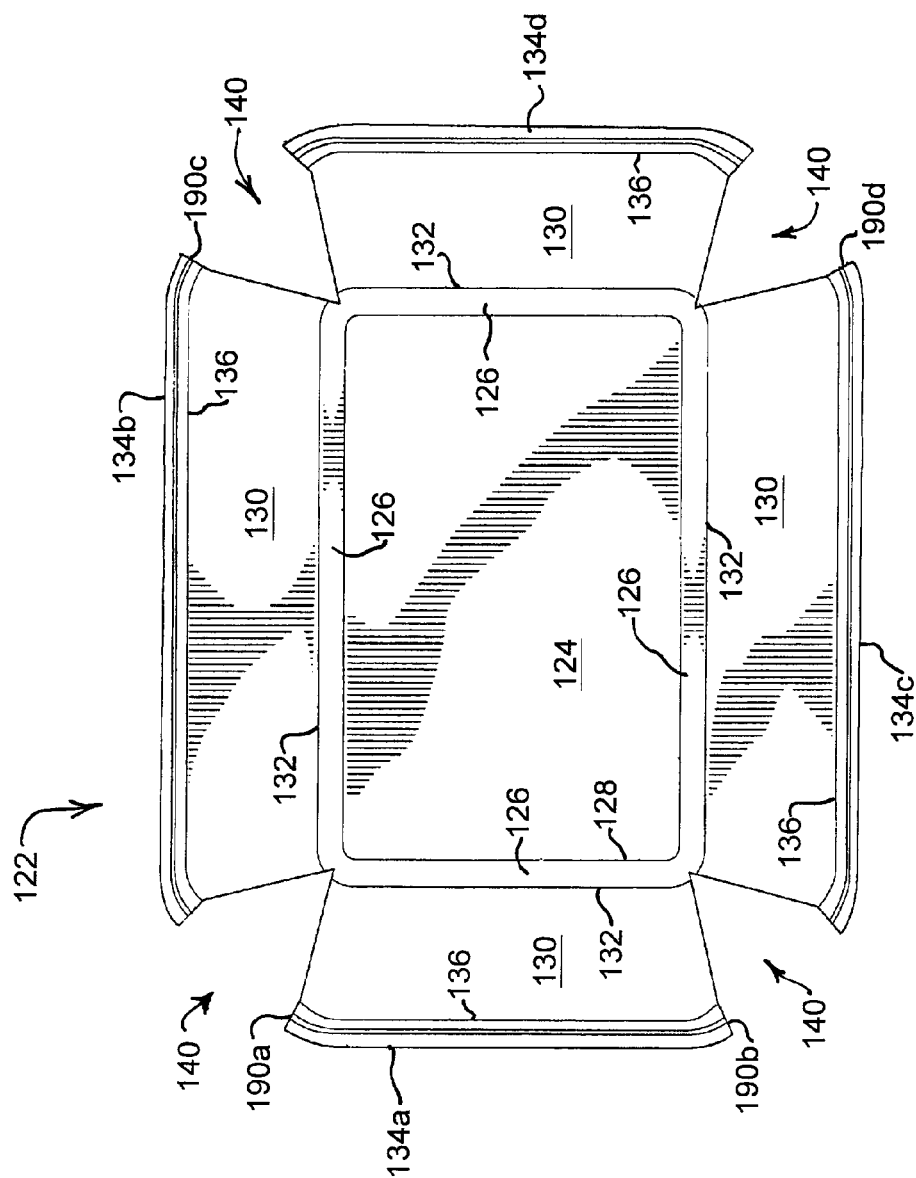
FIG. 2 is a plan view of blank in a flat configuration, in accordance with a first exemplary embodiment of the present disclosure.
Figure 3A:
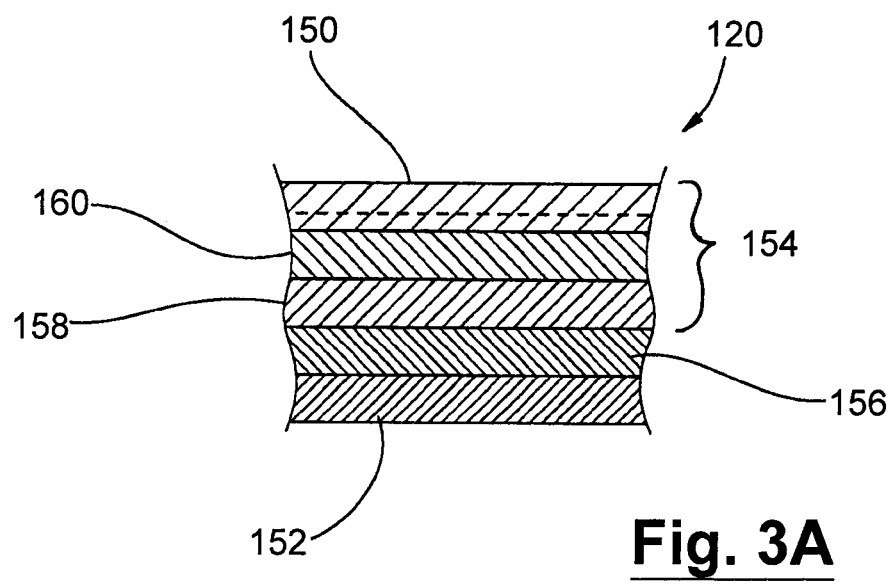
FIGS. 3A and 3B are schematic cross-sectional views respective exemplary laminates from which the blank of FIG. 2 can be constructed.
Figure 3B:
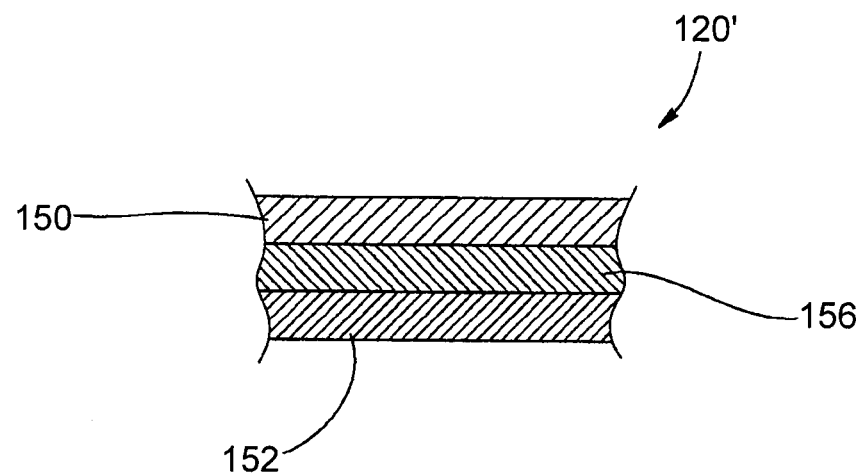
Figure 4:
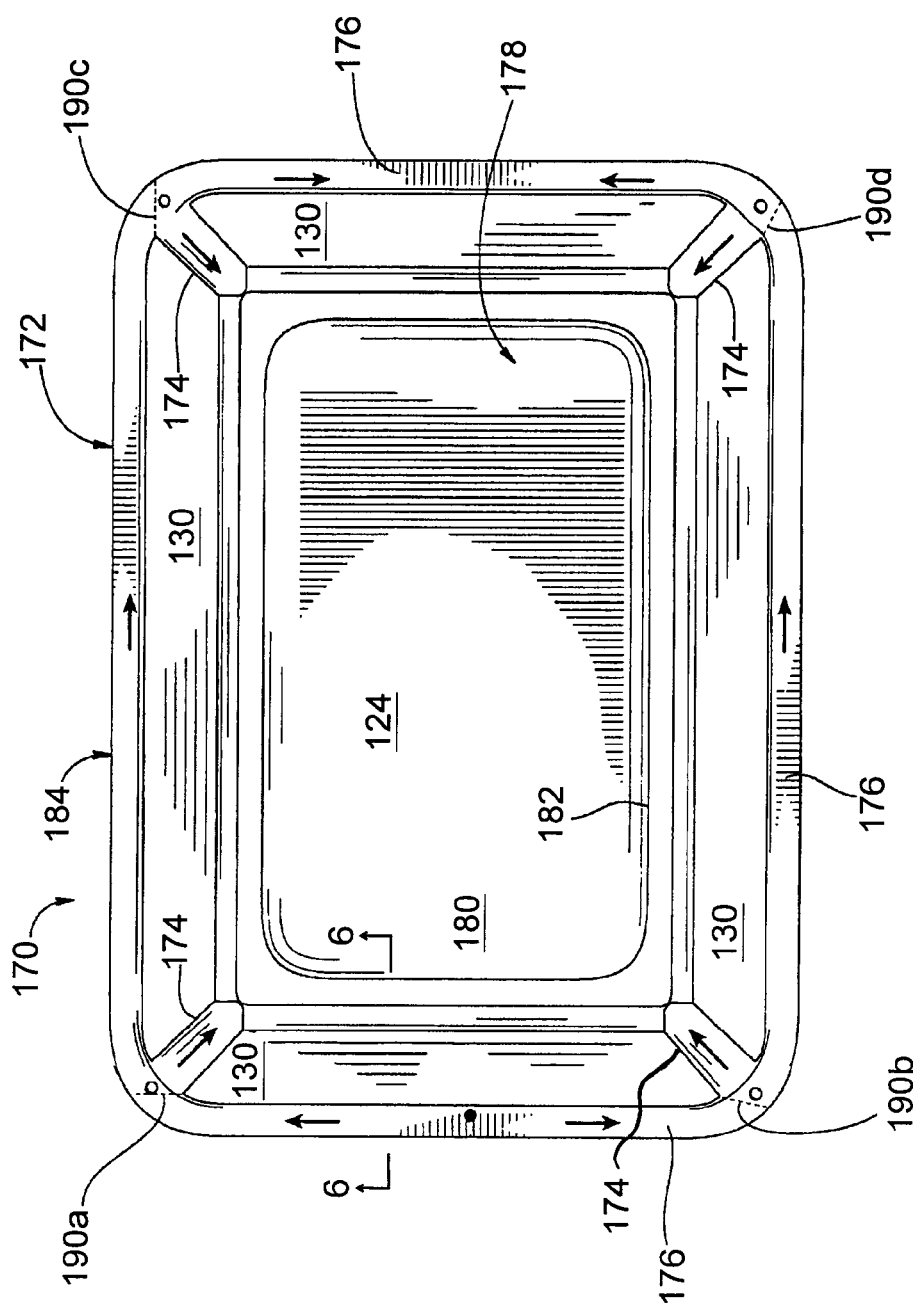
FIG. 4 is a schematic, top plan view of a tray, wherein the tray is constructed from the blank of FIG. 2 and a frame, in accordance with the first exemplary embodiment.

In a first exemplary embodiment, FIG. 2 illustrates a construct, namely a blank 122, that can comprise laminates, such as the laminates 120, 120' shown in FIGS. 3A and 3B, and that can be formed in conjunction with an injection-molded structure 172 into a composite construct or tray 170 as shown in FIG. 4. The composite construct of the first exemplary embodiment is similar to the composite construct shown and described in U.S. Pat. No. 8,124,201 issued on Feb. 28, 2012, the disclosure of which is hereby incorporated by reference for all purposes as if presented herein in its entirety. The tray 170 of the present disclosure, however, includes laminates 120, 120' and injection-molded structure 172 comprising renewable and/or degradable materials. The composite construct of the first exemplary embodiment is shown and described by way of example only. The composite construct of the present disclosure can be any suitable composite construct including renewable materials.

As shown in FIG. 2, the blank 122 includes a base panel 124 that is connected to intermediate panels 126 by an inner fold line 128. The intermediate panels 126 are respectively connected to side panels 130, which can also be characterized as flaps, by intermediate fold lines 132. Flange portions 134a-134d are respectively connected to the side panels 130 by outer fold lines 136. The blank 122 also defines corner gaps 140, each of which is somewhat V-shaped. The blank 122 can be alternatively configured without departing from the disclosure.

As best understood with reference to FIG. 3A, the laminate 120, from which the blank 122 can be formed, includes more than one layer, but alternatively the laminate can be replaced with a single ply of material, such as, but not limited to, paperboard, cardboard, paper, an at least partially bio-derived polymeric sheet, and/or another renewable material. In one embodiment, the laminates 120, 120' can be similar to or the same as the laminates 102 described above in the examples. In accordance with the first exemplary embodiment, the laminate 120 includes an at least partially bio-derived polymer film 150 that is supported by, and secured to, a substrate that can be in the form of cardboard, paperboard 152 or any other suitable material. Alternatively, the paperboard 152 and at least partially bio-derived polymer film 150 can be replaced with any other suitable renewable materials, for example such that the substrate of the present disclosure is not limited to paperboard or the like. As should be apparent, the paperboard 152 can be more generally characterized as a substrate, and a suitable substrate can include paperboard with or without typical supplemental materials, such as coatings that can include clay coatings, colorants, indicia, and the like.

Optionally, and as shown in FIG. 3A, the at least partially bio-derived polymer film 150 can be part of a microwave interactive web 154 that is secured to the paperboard 152 by a layer of adhesive material 156. The web 154 can further include one or more layers of microwave energy interactive material 158 that are secured to the at least partially bio-derived polymer film 150 by one or more layers of adhesive material 160 or by any other suitable means. The microwave energy interactive material 158 can be incorporated in the laminate 120 to enhance or otherwise control the cooking and/or heating of a food item that is contained by a container (e.g., tray 170 of FIG. 4) that is formed from the blank 122 and exposed to microwave energy.

Although the at least partially bio-derived polymer film 150 is described above as being part of the web 154, it is also within the scope of the present disclosure for the at least partially bio-derived polymer film 150 to be adhered directly to the paperboard 154 by way of the layer of adhesive material 156 or by any other acceptable means, such that the one or more layers of microwave energy interactive material 158 and associated adhesive materials 156, 160 are omitted. For example, the film 150 can be extruded directly onto the paperboard 152 (i.e., via an extrusion coating process). In addition, the film 150 can be a coextruded film, as schematically illustrated by the dashed line that is shown as dividing the film 150 in FIG. 3A. A variety of different types of coextrusions with differing numbers of layers and having layers with different characteristics are within the scope of the present disclosure. For example, the various layers of the coextrusion can exhibit a wide variety of different properties such as, but not limited to, properties related to limiting oxygen and moisture transmission. Similarly, various markings (e.g., pictures and/or text) and/or colors can be incorporated into, or deposited on, the film 150 or any other portion of the blank 122 or tray 170.

If the microwave energy interactive material 158 is omitted, the composite construct (e.g., tray 170 of FIG. 4) formed from the blank 122 can be transparent to microwave energy. Nonetheless, such a container that is transparent to microwave energy can still be used in a microwave oven, and it may also be used in a conventional oven. If a container formed from the blank 122 is to be used in a conventional oven at high temperatures, the renewable materials from which the composite construct is formed (e.g., the materials from which the blank 122 is formed) could be selected so that they sufficiently withstand the high temperatures.

As should be apparent from the foregoing, a wide variety of laminates, from which the blank 122 can be formed, are within the scope of the present disclosure. For example and as described above and shown in FIG. 3B, a laminate 120' from which the blank 122 can be formed can include the layer of adhesive material 156 positioned between and joining (either directly or indirectly) the at least partially bio-derived polymer film 150 (which can be in the form of one or more layers of polymer film, or the like) to the substrate (e.g., paperboard) 152. A microwave energy interactive material 158 can optionally be associated with the at least partially bio-derived polymer film 150.

Substantially any microwave energy interactive material 158 can be part of the laminate 120 before the blank 122 formed, or the microwave energy interactive material 158 can be fixed to the blank 122 after the blank has been formed. Alternatively, the microwave interactive web 154 and/or microwave energy interactive material 158 can be applied to or otherwise mounted to an already erected composite construct (e.g., the tray 170). As one specific example, the microwave interactive web can be mounted (e.g., by way of an adhesive material, heat seal coating or any other suitable means) to interior surface(s) of the previously formed tray 170.

The adhesive material 156 can be selected and applied in a manner so that it provides a peel strength that is sufficiently strong so that the at least partially bio-derived polymer film 150 and/or web 154 does not inadvertently become separated from the paperboard 152 at an undesirable time. In accordance with one acceptable method of the exemplary embodiments, it is not desirable for the at least partially bio-derived polymer film 150 and/or web 154 to become separated from the paperboard 152 until after a user has finished using a composite construct (e.g., the tray 170). In one example, the adhesive material 156 can be a soluble adhesive (e.g., a water-soluble adhesive) and/or a releasable adhesive to aid in the degrading of the materials and/or so that the paperboard 152 can be easily separated for recycling.

Whereas a few specific examples of acceptable methods for forming the laminates 120, 120' are discussed above, those of ordinary skill will understand that there are a variety of ways in which the laminates can be constructed. That is, the layers of the laminates 120, 120' can be joined using any suitable process or technique. By way of example, and not limitation, the layers may be joined using adhesive bonding, thermal bonding, or any other chemical or mechanical means. Bonding may be achieved using any suitable process, for example, spraying, roll coating, extrusion lamination, or any other process.

In accordance with the first exemplary embodiment, the tray 170 is at least substantially leakproof and/or hermetically sealed. Therefore, it is typical for each of the fold lines 128, 132, 136 to be a score line that does not form a hole in the blank 122. In accordance with alternative embodiments of the present disclosure, the fold lines 128, 132, 136 can be formed in any conventional manner, the fold lines can be continuous or segmented or partial, and one or more of them can be omitted.

Figure 5:
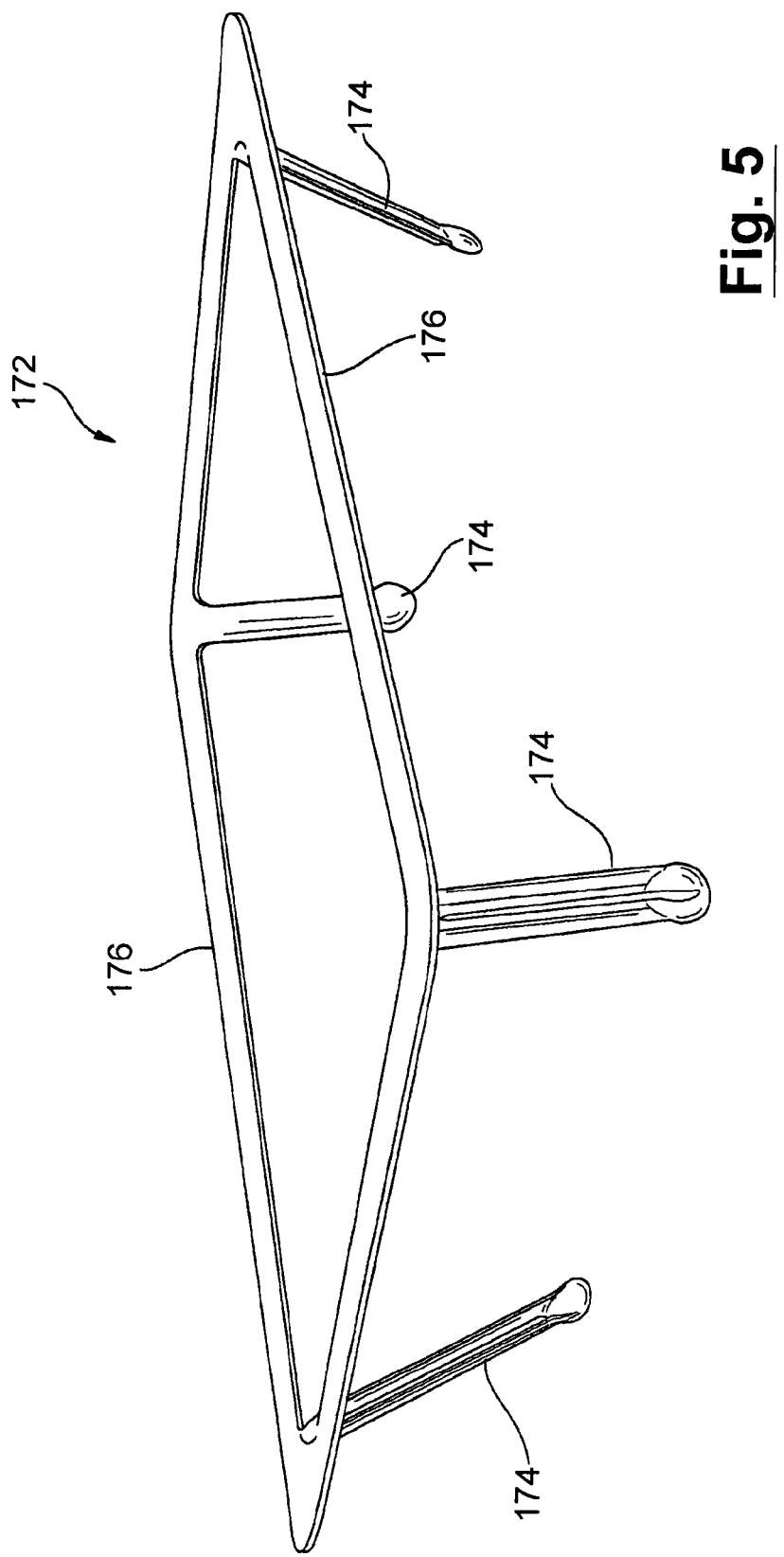
FIG. 5 is a schematic, isolated perspective view of the frame of the tray of FIG. 4.

As best understood with reference to FIG. 4, the tray 170 of the first embodiment includes the blank 122 and an injection-molded element or frame 172 that holds the blank in an erected configuration. The frame 172 can be constructed of an at least partially bio-derived polymeric material; however, the frame can also be constructed of other types of renewable materials. Referring also to FIG. 5, which schematically shows the frame 172 in isolation, the frame 172 includes splines or strip-like corner elements 174 that extend downwardly and somewhat inwardly (obliquely, or more specifically acutely) from a substantially rigid rim or band 176 of the frame 172. In accordance with the first embodiment, the corner elements 174 advantageously hermetically seal the corners of the tray 170.

As best understood with reference to FIG. 4, the panels 124, 130, 126 of the blank 122 (FIG. 2) and the strip-like corner elements 174 of the frame 172 together extend around and define a substantially leakproof cavity 178 of the tray 170. Generally, the at least partially bio-derived polymer film 150 (FIGS. 3A and 3B) of the blank is fluid impervious and in opposing face-to-face relation with the cavity 178. The base panel 124 of the tray 170 optionally includes an embossed area 180 that is partially defined by a score-like line 182 in the base panel 124. The embossed area 180 of the base panel 124 protrudes slightly into the cavity 178 of the tray 170, and it can help to make the tray more rigid.

Figure 6:
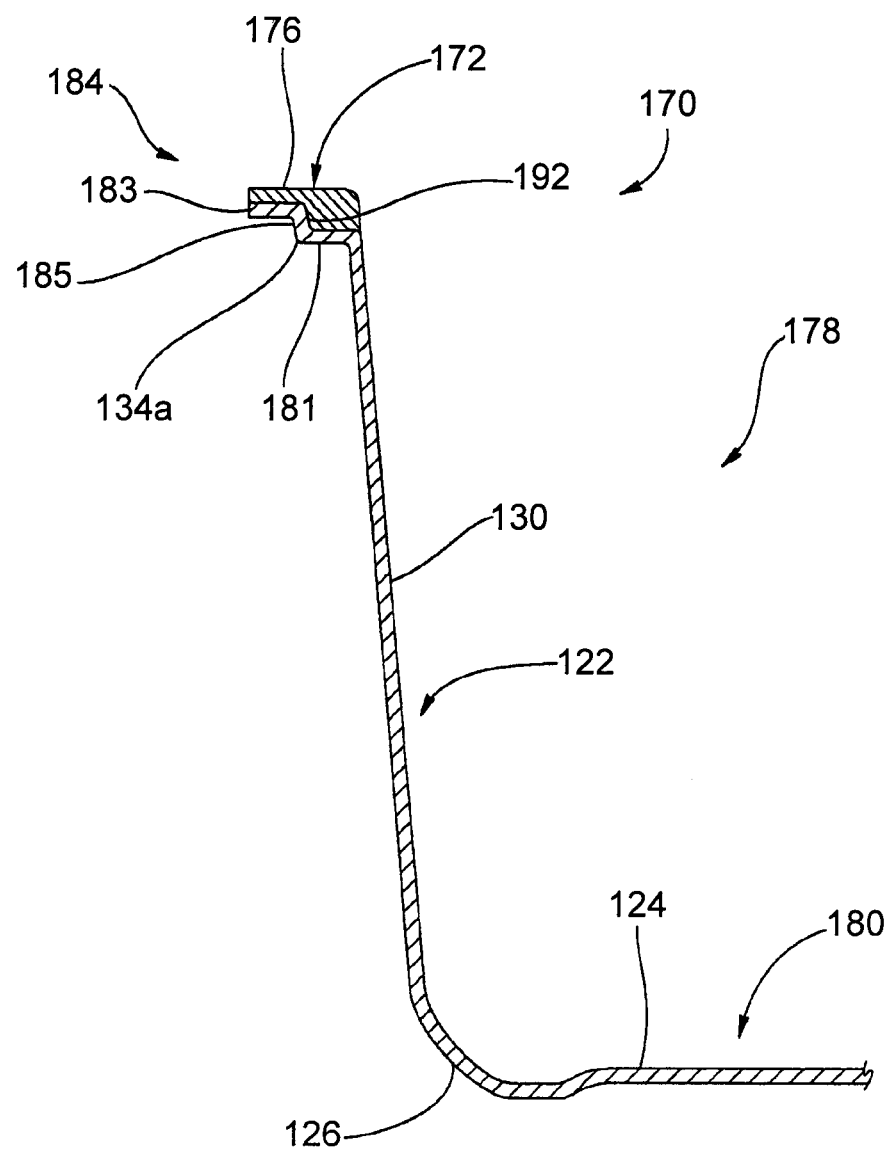
FIG. 6 is a schematic cross-sectional view of the tray of FIG. 4 taken along line 6-6 of FIG. 4, with only the cross-section being shown.

FIG. 6 is a schematic cross-sectional view of the tray 170 taken along line 6-6 of FIG. 4, with only the cross-section being shown. The tray 170 can include a multi-tiered rim 184. The rim 184 extends around and defines an opening to the cavity 178 of the tray 170. The upper portion of the rim 184 can be defined by the band 176 of the frame 172, and the lower portion of the rim 184 can be defined by the flange portions 134a-134d of the blank 122. As shown in FIG. 6, the two tiers of the rim 184 are partially defined by an upright panel or section 185 of each of the flange portions 134a-134d of the blank. A lower flange 181 extends outwardly from the upper edge of the respective side panel 130 to the lower edge of the upright section 185. An upper flange 183 extends outwardly from an upper edge of the upright panel or section 185. All or some of the upper flange 183 can be omitted. Each upright section 185 includes an upright inner shoulder 192. The band 176 can be adhered to the upper surfaces of the flanges 181, 183 and the inner shoulder 192, so that the band includes a flat upper surface positioned above the upper surfaces of the flanges 181, 183, and a cover, lid, or the like can be sealed to the upper surface of the band. The band 176 can be thicker above the lower flange 181 than it is above the upper flange 183, such that the lower flange advantageously partially defines a relatively large channel for having molding material (e.g., fluid polymeric material) flow therein during the injection molding.

FIG. 6 is illustrative of numerous vertical cross sections of the tray 170. More specifically, FIG. 6 is illustrative of and/or representative of, vertical cross-sections taken through each of the side panels 130 and associated portion of the multi-tiered rim 184. On the other hand, other cross-sectional profiles are also within the scope of the present disclosure. For example, the flange portions 134a-134d of the blank can be shaped and/or sized differently, so that the flange portions 134a-134d do not extend all the way to the outer edge of the rim 184 of the tray 170, or so that the flange portions 134a-134d are embedded in the band 176 of the frame 172. As another example, the flange portions 134a-134d of the blank 122, or the like, can extend farther outwardly than the band 176 of the frame 172.

In one embodiment, the tray 170 can comprise a band that is similar to the band 176, but is located below the lower flange 181 and has a first region and a second region, wherein the first region is in contact with the side panel 130 and at least a portion of the lower flange 181, and the second region extends laterally outward from the first region. In one alternative embodiment, the first region has a greater cross-sectional area than the second region such as disclosed in U.S. Pat. Application Publication No. 2007/0194029, filed Apr. 18, 2007, that is incorporated by reference herein for all purposes. Further, the band 176, or other alternatives, can be located around the rim of the tray 170 without the corner elements 174 without departing from the disclosure.

Some aspects associated with an exemplary method of manufacturing the tray 170 are illustrated in FIG. 4. The frame 172 can be manufactured from molding material, namely an at least partially bio-derived polymeric material, that is injected into a mold. That is, the liquid molding material is injected (e.g., via a valve gate). The arrows drawn onto the frame 172 in FIG. 4 schematically illustrate the directions in which some of the fluid molding material can flow to form the frame 172. The arrows drawn onto the frame 172 in FIG. 4 are schematic because they would not be seen on a formed tray 170.

In accordance with the first exemplary embodiment and referring to FIG. 6, flow of the fluid molding material is controlled in a manner that seeks to keep the band 176 of the frame 172 on top of the flange portions 134a-134d of the blank 122. More specifically, end edges of the flange portions 134a-134d (FIG. 2) are respectively overlapped and at least some of the flange portions are optionally held in a predetermined manner by pins so that the fluid molding material flows over the flange portions 134a-134d during injection molding. Even more specifically and as best understood by referring to FIGS. 2 and 4, the flange portions 134a-134d respectively include overlapping end edges 190a, 190b, 190c, 190d (which are hidden from view by the band 176 in FIG. 4 and, therefore, illustrated by dashed lines in FIG. 4). In the tray 170 shown in FIG. 4, the end edge 190a of the flange portion 134a overlaps the adjacent end of the flange portion 134b, so that the end edge of the flange portion 134b is below the flange portion 134a. Similarly, the end edge 190b of the flange portion 134a overlaps the adjacent end of the flange portion 134c. Likewise, the end edge 190c of the flange portion 134b overlaps the adjacent end of the flange portion 134d. Lastly, the end edge 190d of the flange portion 134c overlaps the adjacent end of the flange portion 134d. The overlapping edges can be omitted or otherwise configured without departing from the present disclosure.

In accordance with other embodiments of the present disclosure, different techniques can be used to form the band 176 of the frame 172 on top of the flange portions 134a-134d of the blank 122. As one example, the pinning of the overlapping end edges 190a-190d can be omitted, and the frame 172 can be formed by injecting the fluid molding material into the main cavity of the mold assembly at multiple locations. In contrast and in accordance with other alternative embodiments of the present disclosure, the band 176 of the frame is not formed on top of the flange portions 134a-134d of the blank 122. For example, the flange portions 134a-134d can be embedded within the band 176 or be positioned above the band.

Figure 7:
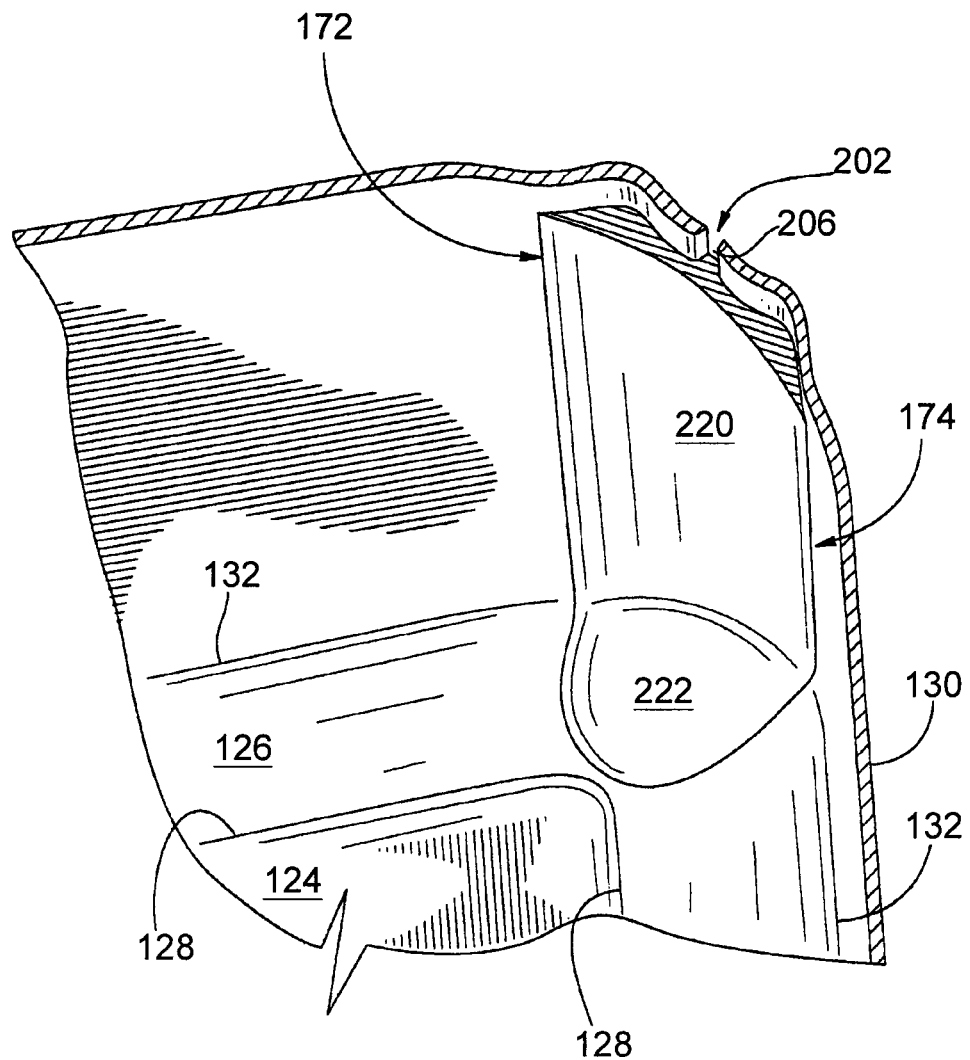
FIG. 7 is a schematic view of the interior of a portion of the tray of FIG. 4, with the upper portion of the tray having been cut away.

FIG. 7 illustrates the inner side of a representative corner of the tray 170, with an upper part of the tray 170 cut away and an additional upper portion of the strip-like corner element 174 of the frame 172 cut away. The strip-like corner element 174 of the frame 172 can be characterized as being, or including, a strip that extends along and at least partially defines the corner of the tray 170, with this strip obstructing a relatively small gap 202. The gap 202 can be defined between the edges of the side panels 130 that partially define the corner. Alternatively, the side panels 130 can at least partially overlap so that the gap 202 is omitted. A majority of the outer side of the corner is defined by the paperboard 152 of the blank 122 or another portion of one or more of the laminates 120, 120', 102, except that a bead 206 (e.g., an elongate, outwardly projecting protrusion) of the associated strip-like corner element 174 of the frame 172 protrudes into and fills (e.g., hermetically seals) the gap 202. Differently configured corners and rims are within the scope of the present disclosure.

As shown in FIGS. 4 and 7, for each interior corner of the tray 170, from top to bottom, the inner side of the corner is smoothly rounded from side to side. The strip-like corner element 174 of the frame 172 that extends into the corner includes an inwardly facing, smooth surface that can be characterized as having an upper portion 220 and a lower portion 222. The corner element 174 is shaped to contribute to the smooth side-to-side curvature of the inner side of the corner of the tray 170. More specifically, the upper portion 220 (of the inwardly facing surface of the strip-like corner element 174) extends concavely and smoothly between the adjacent side panels 130, and all the way up to the rim 184. The lower portion 222 (of the inwardly facing surface of the corner element 174) extends smoothly and in somewhat of a concave and/or bowl-like fashion between the adjacent intermediate panels 126.

Figure 8:
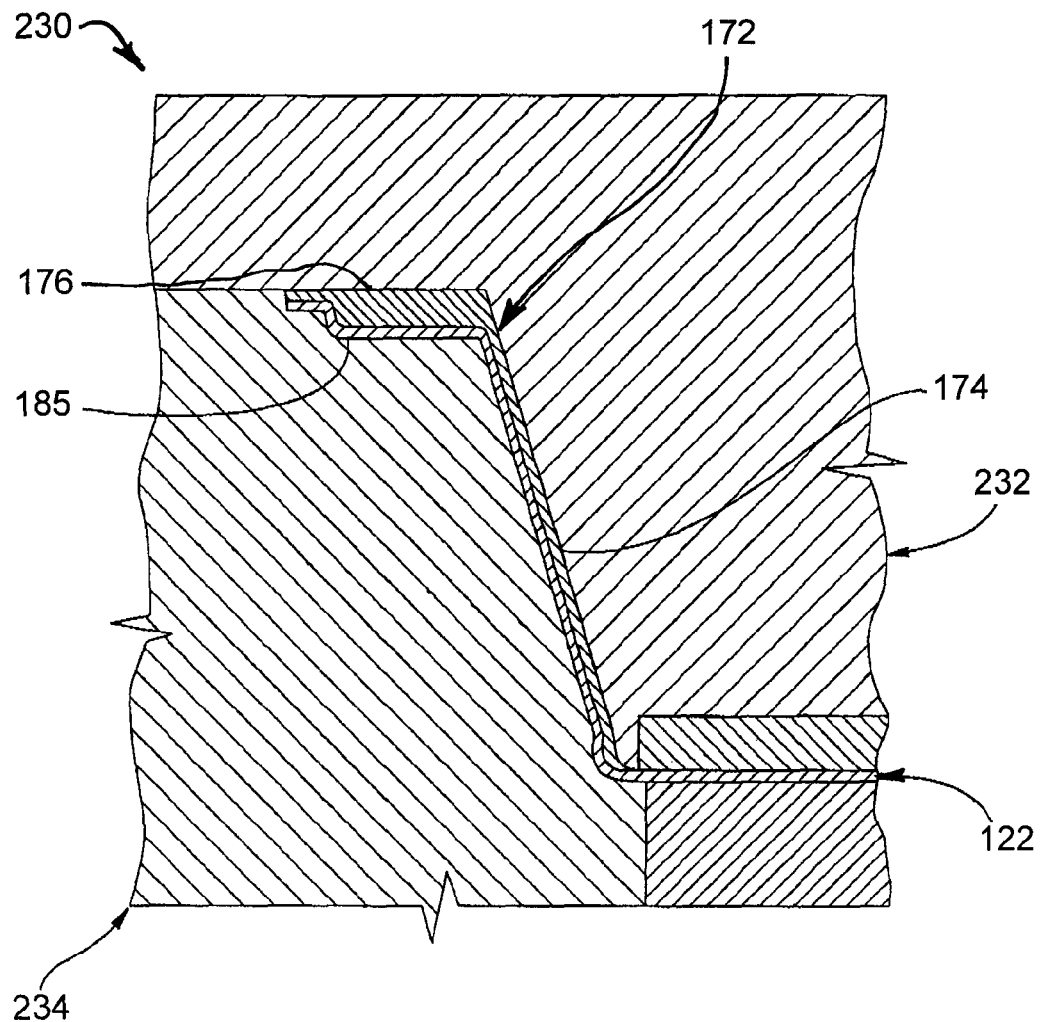
FIG. 8 is a partial cross-sectional view of a mold assembly forming the tray of FIG. 4

According to the first exemplary embodiment, FIG. 8 shows a portion of a forming tool or mold assembly 230 for forming the tray 170 from the blank 122 and the at least partially bio-derived polymer. For example, the blank 122 can be positioned and/or secured against a female mold 234, and the female mold 234 and a male mold 232 can be brought together so that the blank 122 is sandwiched between the female and male molds 234, 232. As the mold assembly 230 further closes, interaction between the blank 122 and the mold assembly 230 causes folding to occur along the fold lines 128, 132, 136 of the blank so that the blank becomes erected. As a result, the blank 122 is in an erected state within the main cavity of the mold assembly 230 when the mold assembly achieves the fully closed configuration that is partially schematically illustrated in FIG. 8. Channels for receiving the molding material are formed at least between the erected blank 122 and the male mold 232. The channels at least generally correspond to the shape of the frame 172. More specifically and for example, as fluid molding material (e.g., fluid polymeric material that is at least partially bio-derived) is forced under pressure into initial channels, at least some of the initial channels expand and are transformed into resultant channels due to movement of respective portions of the blank 122 while the fluid molding material flows within the channels. This includes liquid molding material flowing with sufficient force to cause portions of the blank 122 to be pressed against respective surfaces of the female mold 234.

In one example, the liquid molding material is an at least partially bio-derived polymer that is injected into the closed mold assembly 230 with the injected polymer being at a temperature of about 500 degrees Fahrenheit and a pressure of approximately 2000 lb/in$^2$. The injection temperature and pressure may depend upon the at least partially bio-derived polymer that is injected, and a wide variety of at least partially bio-derived polymers, temperatures, and pressures are within the scope of the present disclosure. For example and not for the purpose of limiting the scope of the present disclosure, suitable at least partially bio-derived polymers for being injected may be at least partially bio-derived polypropylene, at least partially bio-derived nylon, and at least partially bio-derived polyethylene terephthalate (PET). The polymeric liquid molding material that is injected into the closed mold assembly 230 may include one or more additives, such as short natural fibers. Short natural fibers can include, for example, natural fibers with an average length of about 1 millimeter to about 100 millimeters or an average length to diameter ratio of about 5:1 to about 100:1. However, any suitable fiber length can be used without departing from the disclosure. Impregnating the at least partially bio-derived polymeric liquid molding material with short natural fibers can help to advantageously control and/or minimize shrinkage of the solidifying at least partially bio-derived polymeric material. The at least partially bio-derived polymeric liquid molding material may include about 30% natural fibers by weight, although other amounts and other additives are also within the scope of the present disclosure.

After the liquid molding material solidifies so that the tray 170 is formed within the mold assembly 230, the mold assembly can be opened, and the tray 170 can be removed.

In accordance with the first embodiment, the film 150 of the laminate 120 and the molding material (e.g., at least partially bio-derived polymeric material) from which the tray 170 are constructed are selected to be compatible, so that there is good adhesion between the frame 172 and the film 150 of the blank 122. In one example, both the frame 172 and the film 150 are an at least partially bio-derived nylon or polyethylene terephthalate. A wide variety of other at least partially bio-derived polymers can also be used. When the film 150 is a coextrusion, at least the outer-most layer of the film 150 is selected to be compatible with the frame 172 so that there is good adhesion therebetween. In an alternative embodiment, such as where the materials are selected so that there is less adhesion between them (i.e., less adhesion between the frame 172 and the blank 122), the blank or portions thereof (e.g., edges of the blank) can be at least partially embedded in, or encapsulated by, the frame in a manner such that the blank and the frame are nonetheless fixedly attached to one another, if desired.

Initially forming the blank 122 with the fold lines 128, 132, 136, which can be score lines, seeks to aid in the erecting of the blank within the closing mold assembly 230. However, one or more of the score lines (e.g., fold lines 128, 132, 136) could be omitted from the blank 122, in which case it may be necessary to close the mold assembly relatively slowly, in an effort to ensure that the blank is properly erected therein. A variety of different blanks are within the scope the scope of the present disclosure. Likewise, a variety of different mold assemblies are within the scope of the present disclosure. Therefore, a variety of different composite constructs (e.g., blanks, trays, cartons, sleeves, and other containers) are also within the scope of the present disclosure.

Figure 9:
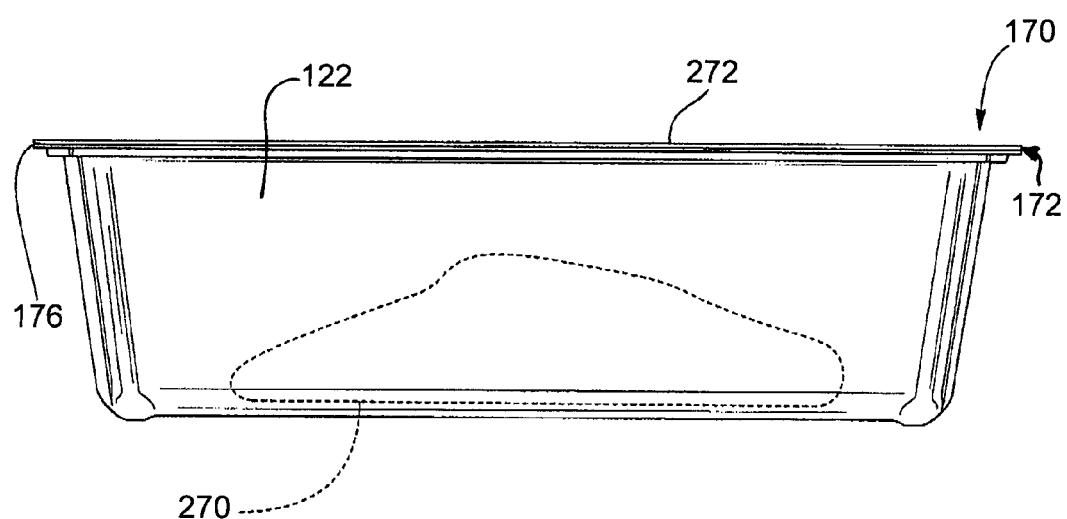
FIG. 9 is a side view of the tray of FIG. 4.

In accordance with the first embodiment, after the tray 170 is formed, food can be placed in the tray's cavity 178, and then the tray's opening can be closed in a leakproof manner, such as with a cover in the form of a lidding film or polymeric overwrap that can be advantageously heat sealed to the flat upper surface of the band 176 of the frame 172. For example, FIG. 9 schematically illustrates the tray 170 of FIG. 4 containing a food product 270 and closed with a polymer film 272 that is heat sealed to the substantially flat, upwardly facing surface of the band 176 of the frame 172. FIG. 9 is schematic because the food 270, which is hidden from view, is shown by dashed lines, and the thickness of the polymer film 272 that closes the tray 170 is exaggerated. The polymer film 272 can comprise an at least partially bio-derived polymer or any suitable renewable or degradable material. Alternatively, the tray 170 can be closed with lids made of laminates that are similar to or the same as the laminates 102 described in the examples above, paperboard, foil, or any other suitable material. A variety of mechanisms for closing the opening of the tray 170, such as in a leakproof manner, are within the scope of the present disclosure.

In the first exemplary embodiment, the tray 170 is formed from a blank 122 and includes a frame 172 with rim 176 and splines 174. According to a second exemplary embodiment shown by way of example in FIG. 10, the composite construct (e.g., container 302) can be preformed, molded, and/or pressed into shape. Alternatively, the container 302 can be formed from a generally flat blank (not shown), in accordance with one exemplary embodiment of the present disclosure.

The container 302 of the second exemplary embodiment can include an injection-molded structure 338 that forms part of a rim of the container 302 without splines. Alternatively, the injection-molded structure 338 can include splines to help seal and/or reinforce the container 302. The composite construct of the second exemplary embodiment is similar to the composite construct shown and described in U.S. Pat. No. 7,975,871 issued on Jul. 12, 2011, the disclosure of which is hereby incorporated by reference for all purposes as if presented herein in its entirety. The container 302 of the present disclosure, however, comprises renewable and/or degradable materials. The composite construct of the second exemplary embodiment is shown and described by way of example only. The composite construct of the present disclosure can be any suitable composite construct including renewable materials.

Figure 10:
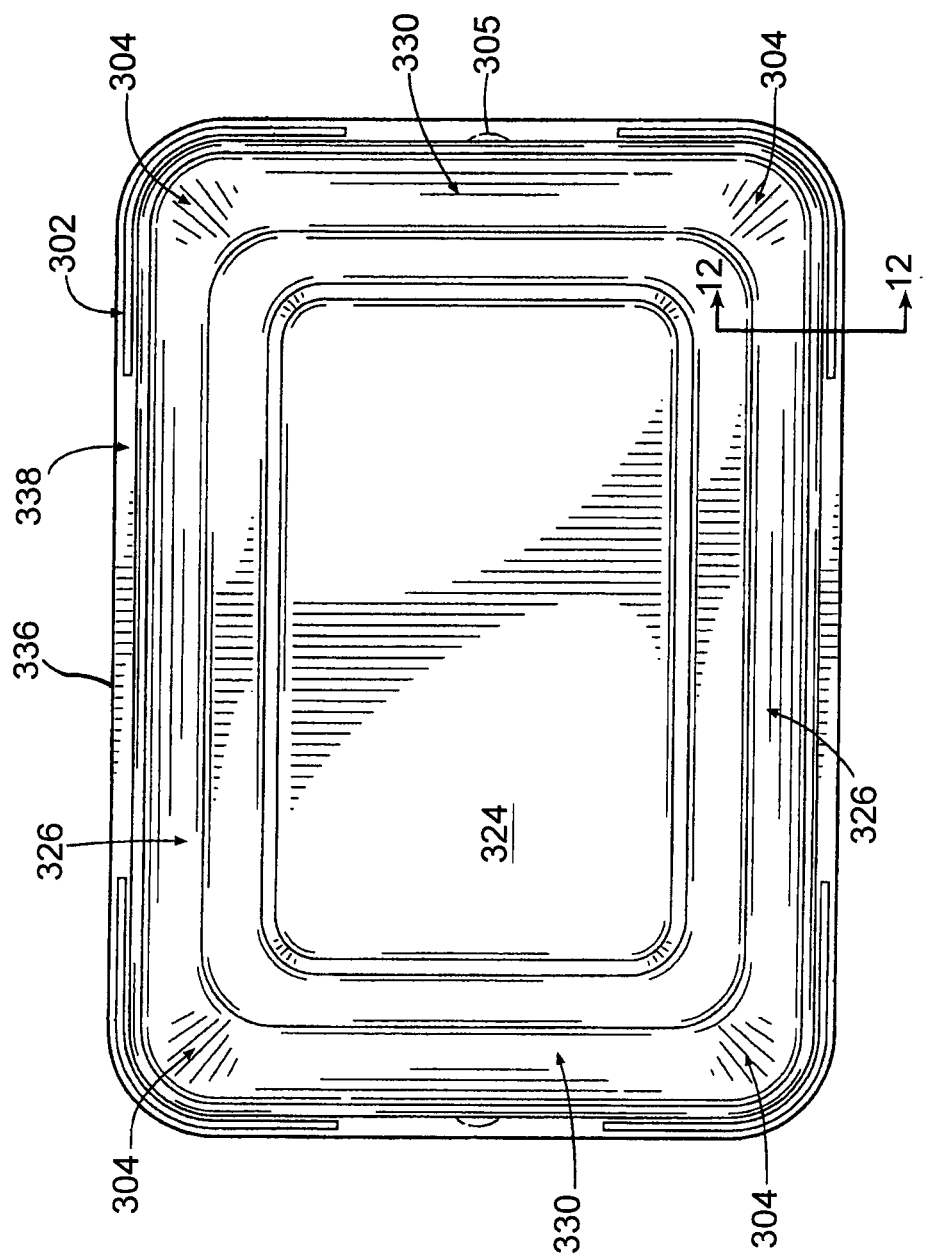
FIG. 10 is a bottom view of container in accordance with a second exemplary embodiment of the present disclosure.

As shown in FIG. 10, the container 302 comprises a base panel 324, two side panels 326 extending generally upwardly relative to the base panel 324, and two end panels 330 extending generally upwardly relative to the base panel 324. In the illustrated embodiment, the container 302 is generally a tray having an open top 305 (FIG. 12) and four rounded corners 304 at respective junctions between the side panels 326 and end panels 330. The base panel 324, side panels 326, end panels 330, and rounded corners 304 form a cavity 309 (FIG. 12) for receiving a food product or other substance. The container 302 can include a flange 336 formed at the upper edges of the side panels 326, end panels 330, and corners 304. The flange 336 extends laterally outward from respective upper edges of the side panels 326, end panels 330, and corners 304 to form a top edge of the container.

In the illustrated embodiment, the container 302 and cavity 309 (FIG. 12) formed therein are generally rectangular. The container 302 may be other shapes (e.g. circular) without departing from the disclosure. Furthermore, the corners 304 of the illustrated embodiment are formed corners that can be press-formed during formation of the container 302. The container 302 may have corners that are otherwise formed.

Figure 11:
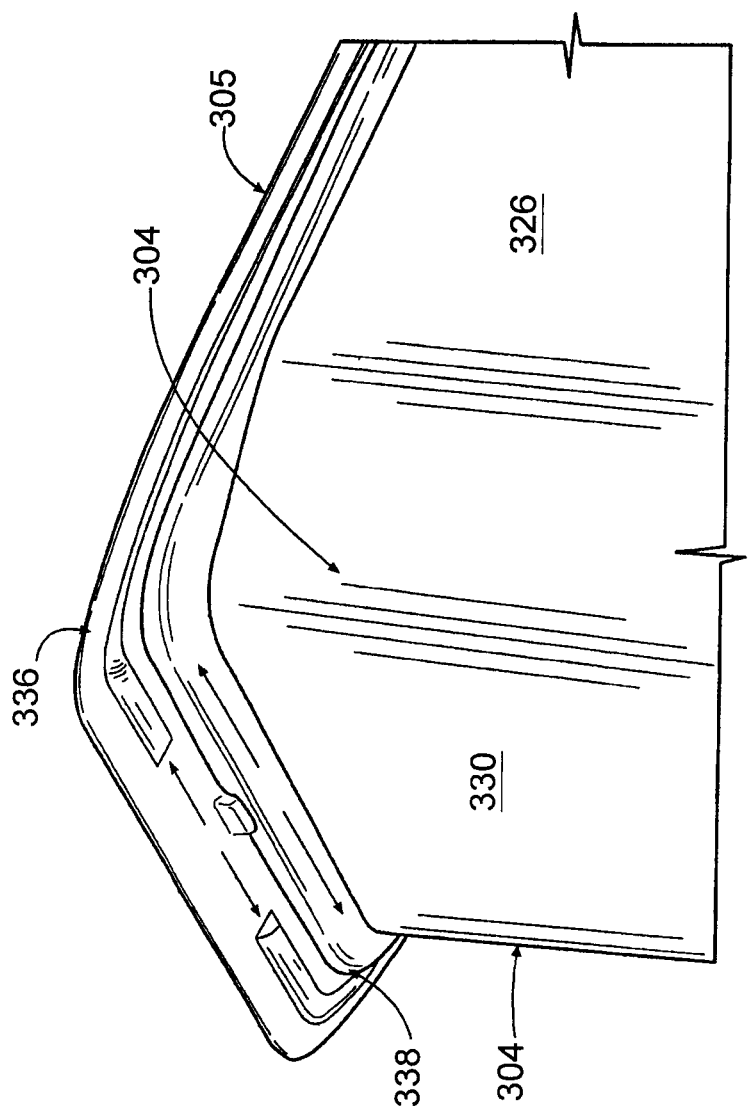
FIG. 11 is a detail view of a portion of the container of FIG. 10.
Figure 12:
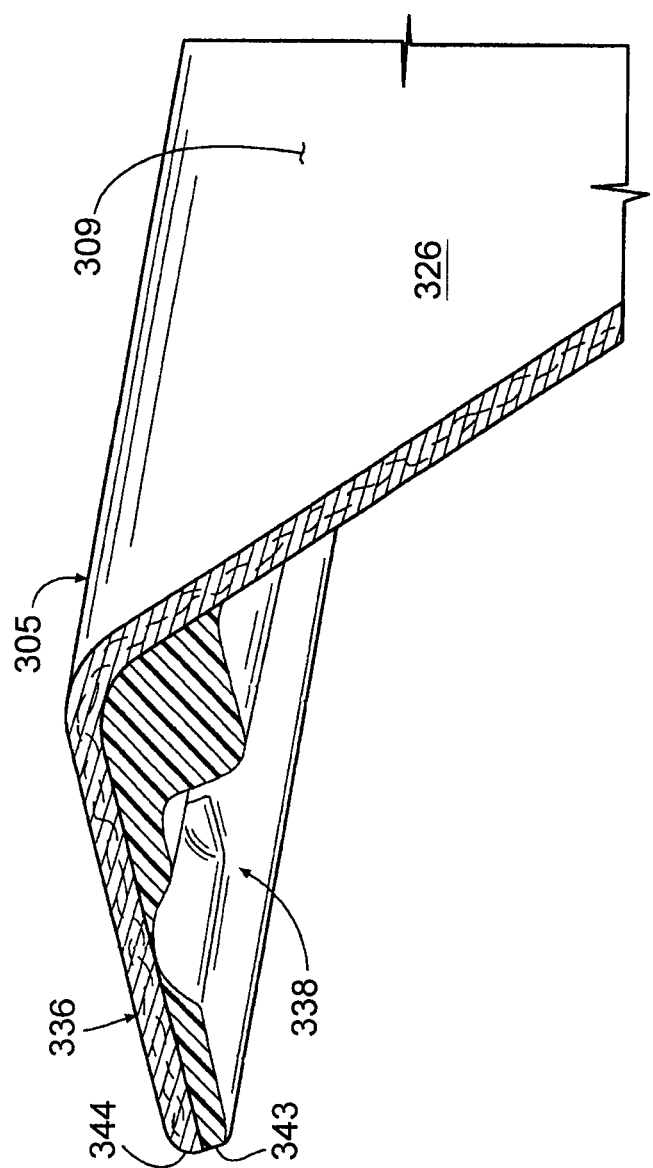
FIG. 12 is a perspective of a partial cross-section of the container taken along the line 12-12 of FIG. 10.

In one embodiment, as shown in FIGS. 11 and 12, the container 302 includes an injection-molded structure 338 extending around the perimeter of the container on the underside of the flange 336. The structure 338 is generally constructed of an at least partially bio-derived polymeric material; however, the structure can also be constructed of other types of renewable and/or degradable materials. In the illustrated embodiment, the structure 338 extends around the perimeter of the container 302 and helps to increase the rigidity of the container. As shown in FIG. 12, the structure 338 is generally disposed adjacent the upper edges of the side panels 326 and end panels 330 and extends laterally outward therefrom. In the illustrated embodiment, the structure 338 extends laterally outward to a lateral edge 343 of the injection-molded structure 338. The lateral edge 343 of the structure 338 generally coincides with the lateral edge 344 of the flange 336. In other embodiments, the distal portion of the injection-molded structure 338 can extend laterally outward beyond the edge 344 of the flange 336 or the distal portion could partially extend to a location that is laterally inward of the free edge of the flange such that the flange extends beyond the edge of the injection-molded structure 338. In another embodiment, the injection-molded structure 338 could extend along at least a portion of the underside of the flange 336, at least a portion of the upper side of the flange, and/or along at least a portion of the edge 344 of the flange. In one embodiment, the injection-molded structure 338 could at least partially encapsulate the flange 336 so that the injection-molded structure 338 extends along a portion of the top of the flange, the bottom of the flange, and the edge of the flange.

The container 302 can be formed from a laminate that includes more than one layer, but alternatively the laminate can be a single ply of material, such as, but not limited to, paperboard, cardboard, paper or an at least partially bio-derived polymeric sheet. In accordance with the exemplary embodiments of the present disclosure, the laminate can include an at least partially bio-derived polymer film or an extruded at least partially bio-derived polymer coating that is supported by, and secured to, a substrate that can be in the form of cardboard, paperboard, or any other suitable material. Alternatively, the paperboard and at least partially bio-derived polymer film can be replaced with any other suitable materials, for example such that the substrate of the present disclosure is not limited to paperboard or the like. As should be apparent, the paperboard can be more generally characterized as a substrate, and a suitable substrate can include paperboard with or without typical supplemental materials, such as coatings that can include clay coatings, colorants, indicia and the like. Further, the container 302 can include other materials, laminates, substrates, etc. such as the materials described above in relation to the blank 122 of the first exemplary embodiment. The container 302 optionally can include microwave energy interactive material.

The tray 170 and the container 302, are two examples of a composite construct of the present disclosure. For example, other composite constructs are shown and described in at least U.S. Patent Application Publication No. 2010/0308064, filed Jun. 24, 2010; U.S. Patent Application Publication No. 2010/0314801, filed Jun. 24, 2010; and U.S. Patent Application Publication No. 2011/0012291, filed Jul. 20, 2010, the disclosures of which are hereby incorporated by reference for all purposes as if presented herein in their entirety. However, the composite construct can be substantially any construct such as for holding a food item or other product (e.g., container, sleeve, or other construct), wherein the composite construct includes multiple elements (e.g., a laminate and an injection-molded element) comprising renewable and/or degradable materials.

Several examples of natural fibers, renewable polymers, and composites thereof are described in U.S. Patent Application Publication No. 2009/0236063, filed Sep. 21, 2007; U.S. Patent Application Publication No. 2010/0029809, filed May 21, 2009; U.S. Patent Application Publication No. 2010/0144932, filed Dec. 9, 2009; U.S. Patent Application Publication No. 2010/0266792, filed Aug. 21, 2009; U.S. Patent Application Publication No. 2010/0320637, filed Aug. 27, 2010; "Pretreatments of Natural Fibers and their Application as Reinforcing Material in Polymer Composites—a Review," Polymer Engineering and Science, Jul. 1, 2009, by Kalia, Susheel, et al.; "Design of a Hemp-Reinforced PET Composite I-Beam," Thesis Submitted to the Faculty of Science and Engineering of the Royal Military College of Canada by A. S. Fotso Talla, November 2008, Publisher: Ottawa: Library and Archives Canada [2010]; "Natural Fiber-Reinforced Polymer Composites," Proceedings of the Pakistan Academy of Science 44(2):129-144.2007 by Saira Taj, et al. March 2007; and "Are Natural Fiber Composites Environmentally Superior to Glass Fiber Reinforced Composites?" Composites: Part A: Applied Science and Manufacturing 35 (2004), 371-376 by S. V. Joshi, et al. (Michigan State University), the disclosures of which are hereby incorporated by reference for all purposes as if presented herein in their entirety. The renewable materials and natural fibers included in the above disclosures are included by way of example only, and the present disclosure should not be limited to these materials.

An example of a generally homogenous container (e.g., the container generally includes a single element: a structural layer that is coated or laminated with a fluid layer) that is compostable is described in U.S. Patent Application Publication No. 2010/0044267, filed Aug. 19, 2009, the disclosure of which is hereby incorporated by reference for all purposes as if presented herein in its entirety. A composite construct according to the present disclosure can include similar or the same materials as one or more elements of the composite construct in one example.

Any of the various constructs of the present disclosure may optionally include one or more features that alter the effect of microwave energy during the heating or cooking of a food item that is associated with the construct. For example, the construct may be formed at least partially from one or more microwave energy interactive elements (hereinafter sometimes referred to as "microwave interactive elements") that promote browning and/or crisping of a particular area of the food item, shield a particular area of the food item from microwave energy to prevent overcooking thereof, or transmit microwave energy towards or away from a particular area of the food item. Each microwave interactive element comprises one or more microwave energy interactive materials or segments arranged in a particular configuration to absorb microwave energy, transmit microwave energy, reflect microwave energy, or direct microwave energy, as needed or desired for a particular construct and food item.

The microwave interactive element may be supported on a microwave inactive or transparent substrate for ease of handling and/or to prevent contact between the microwave interactive material and the food item. As a matter of convenience and not limitation, and although it is understood that a microwave interactive element supported on a microwave transparent substrate includes both microwave interactive and microwave inactive elements or components, such constructs are referred to herein as "microwave interactive webs".

In one example, the microwave interactive element may comprise a thin layer of microwave interactive material that tends to absorb microwave energy, thereby generating heat at the interface with a food item. Such elements often are used to promote browning and/or crisping of the surface of a food item (sometimes referred to as a "browning and/or crisping element"). When supported on a film or other substrate, such an element may be referred to as a "susceptor film" or, simply, "susceptor". However, other microwave energy interactive elements are included in the disclosure.

As another for example, the microwave interactive element may comprise a foil having a thickness sufficient to shield one or more selected portions of the food item from microwave energy (sometimes referred to as a "shielding element"). Such shielding elements may be used where the food item is prone to scorching or drying out during heating.

As still another example, the microwave interactive element may comprise a segmented foil. Although segmented foils are not continuous, appropriately spaced groupings of such segments often act as a transmitting element to direct microwave energy to specific areas of the food item. Such foils also may be used in combination with browning and/or crisping elements, for example, susceptors.

As stated above, any of the above elements and numerous others contemplated hereby may be supported on a substrate. The substrate can comprise an electrical insulator, for example, a polymer film or material. Generally, as used herein the term "polymer" or "polymeric material" includes, but is not limited to, homopolymers, copolymers, such as for example, block, graft, random, and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic, and random symmetries. Other substrate materials such as paper and paper laminates, metal oxides, silicates, cellulosics, or any combination thereof, also may be used.

The microwave energy interactive material may be applied to the substrate in any suitable manner, and in some instances, the microwave energy interactive material is printed on, extruded onto, sputtered onto, evaporated on, or laminated to the substrate. The microwave energy interactive material may be applied to the substrate in any pattern, and using any technique, to achieve the desired heating effect of the food item. Although particular examples of patterns of microwave energy interactive material are shown and described herein, it should be understood that other patterns and types of microwave energy interactive material are contemplated by the present disclosure.

As mentioned above, numerous differently configured constructs are within the scope of the present disclosure. As one example, a tray could be configured so that it includes multiple compartments, and the compartments can respectively include (or be associated with) microwave energy interactive material with different characteristics. More specifically, one of the compartments can include shielding elements, another compartment can include a susceptor, and another compartment can include a transmitting element. Other variations between compartments are also within the scope of the present disclosure.

In accordance with the exemplary embodiments, the blanks can be formed from paperboard, corrugated cardboard or other materials having properties suitable for at least generally enabling respective functionalities described above. Paperboard can be of a caliper such that it is heavier and more rigid than ordinary paper, and corrugated cardboard can be of a caliper such that it is heavier and more rigid than paperboard. Generally, at least the side of the paperboard or cardboard that will be an exterior surface in the carton erected therefrom will be coated with a clay coating, or the like. The clay coating can be printed over with product, advertising, price-coding, and other information or images. The blanks may then be coated with a varnish to protect any information printed on the blanks. The blanks may also be coated with, for example, a moisture barrier layer, on one or both sides. The blanks can also be laminated to or coated with one or more sheet-like materials.

In accordance with the exemplary embodiments of the present disclosure, a fold line can be any at least somewhat line-like arranged, although not necessarily straight, form of weakening that facilitates folding therealong; and a tear line can be any at least somewhat line-like arranged, although not necessarily straight, form of weakening that facilitates tearing therealong. More specifically, but not for the purpose of narrowing the scope of the present disclosure, conventional fold lines include: a crease, such as formed by folding; a score line, such as formed with a blunt scoring knife, or the like, which creates a crushed portion in the material along the desired line of weakness; a slit that extends partially into the material along the desired line of weakness, and/or a series of spaced apart slits that extend partially into and/or completely through the material along the desired line of weakness; or various combinations of these features.

The foregoing description illustrates and describes various embodiments of the disclosure. As various changes could be made in the above construction, it is intended that all matter contained in the above description or shown in the accompanying drawings shall be interpreted as illustrative and not in a limiting sense. Furthermore, various modifications, combinations, and alterations, etc., of the above-described embodiments are within the scope of the disclosure. Additionally, the disclosure shows and describes only selected embodiments, but various other combinations, modifications, and environments are within the scope of the disclosure, commensurate with the above teachings, and/or within the skill or knowledge of the relevant art. Furthermore, certain features and characteristics of each embodiment may be selectively interchanged and applied to other illustrated and non-illustrated embodiments without departing from the scope of the disclosure.

What is claimed is:

1. A composite construct, comprising:
   a side wall extending at least partially around an interior of the composite construct;
   at least a portion of the side wall comprising at least one laminate, the at least one laminate comprising at least one layer of material that comprises a first renewable polymer; and
   at least one injection-molded element comprising at least a second renewable polymer.

2. The composite construct of claim 1, wherein the at least one injection-molded element comprises a plurality of natural fibers.

3. The composite construct of claim 2, wherein the plurality of natural fibers are at least partially produced by at least one plant source.

4. The composite construct of claim 1, wherein the first renewable polymer is substantially the same as the second renewable polymer.

5. The composite construct of claim 1, wherein at least one of the first renewable polymer and the second renewable polymer is an at least partially degradable polymer.

6. The composite construct of claim 5, wherein the at least partially degradable polymer is a polylactide-based polymer.

7. The composite construct of claim 1, wherein at least one of the first renewable polymer and the second renewable polymer is an at least partially bio-derived polymer.

8. The composite construct of claim 7, wherein the at least partially bio-derived polymer is cellulose.

9. The composite construct of claim 1, wherein the laminate comprises at least one substrate, and the at least one layer of material is applied to at least one side of the substrate.

10. The composite construct of claim 9, wherein the at least one layer of material comprises at least a first layer applied to the substrate and a second layer applied to the first layer.

11. The composite construct of claim 10, wherein the first layer comprises a microwave energy interactive material, and the second layer comprises the first renewable polymer.

12. The composite construct of claim 9, wherein the substrate comprises paperboard.

13. The composite construct of claim 1, wherein the sidewall comprises at least one corner, and the injection-molded element comprises at least one spline extending in the at least one corner.

14. The composite construct of claim 13, further comprising a rim extending from a top end of the sidewall, the injection-molded element comprises a band forming at least a portion of the rim, and the band of the injection-molded element is integrally formed with the at least one spline.

15. The composite construct of claim 1, further comprising a flange extending from the sidewall, the flange comprising the at least one laminate.

16. The composite construct of claim 15, wherein the injection-molded element comprises a structure extending around at least a portion of a perimeter of the composite construct along at least a portion of the flange.

17. The composite construct of claim 16, wherein the structure of the injection-molded element is secured to an underside of the flange adjacent an upper portion of the sidewall.

18. The composite construct of claim 1, further comprising a bottom wall and a flange, the side wall extending from the bottom wall to the flange.

19. A blank for forming a composite construct, comprising:
   at least one laminate for forming at least a sidewall of the composite construct formed from the blank, the at least one laminate comprising at least one layer of material that comprises a first renewable polymer; and
   at least one injection-molded element comprising at least a second renewable polymer, the at least one injection-molded element for being combined with the at least one laminate for forming the composite construct from the blank.

20. The blank of claim 19, wherein the at least one injection-molded element comprises a plurality of natural fibers.

21. The blank of claim 20, wherein the plurality of natural fibers are at least partially produced by at least one plant source.

22. The blank of claim 19, wherein the first renewable polymer is substantially the same as the second renewable polymer.

23. The blank of claim 19, wherein at least one of the first renewable polymer and the second renewable polymer is an at least partially degradable polymer.

24. The blank of claim 23, wherein the at least partially degradable polymer is a polylactide-based polymer.

25. The blank of claim 19, wherein at least one of the first renewable polymer and the second renewable polymer is an at least partially bio-derived polymer.

26. The blank of claim 25, wherein the at least partially bio-derived polymer is cellulose.

27. The blank of claim 19, wherein the at least one laminate comprises at least one substrate, and the at least one layer of material is applied to at least one side of the substrate.

28. The blank of claim 27, wherein the at least one layer of material comprises at least a first layer applied to the substrate and a second layer applied to the first layer.

29. The blank of claim 28, wherein the first layer comprises a microwave energy interactive material, and the second layer comprises the first renewable polymer.

30. The blank of claim 27, wherein the substrate comprises paperboard.

31. The blank of claim 19, wherein the at least one laminate is for forming a flange extending from the side wall when the composite construct is formed from the blank.

32. The blank of claim 31, wherein the injection-molded element is for forming a structure extending around at least a portion of a perimeter of the composite construct formed from the blank along at least a portion of the flange when the composite construct is formed from the blank.

33. A composite construct, comprising:
   a side wall extending at least partially around an interior of the composite construct;
   at least a portion of the side wall comprising at least one laminate, the at least one laminate comprising at least one layer of material that comprises a first polymer; and
   at least one injection-molded element comprising at least a second polymer;
   wherein at least one of the first polymer and the second polymer is a renewable polymer, and at least one of the first polymer and the second polymer is an at least partially degradable polymer.

34. The composite construct of claim 33, wherein the at least one injection-molded element comprises a plurality of natural fibers.

35. The composite construct of claim 34, wherein the plurality of natural fibers are at least partially produced by at least one plant source.

36. The composite construct of claim 33, wherein the first polymer is substantially the same as the second polymer.

37. The composite construct of claim 33, wherein the at least partially degradable polymer is a polylactide-based polymer.

38. The composite construct of claim 33, wherein at least one of the first polymer and the second polymer is an at least partially bio-derived polymer.

39. The composite construct of claim 38, wherein the at least partially bio-derived polymer is cellulose.

40. The composite construct of claim 33, wherein the laminate comprises at least one substrate, and the at least one layer of material is applied to at least one side of the substrate.

41. The composite construct of claim 40, wherein the at least one layer of material comprises at least a first layer applied to the substrate and a second layer applied to the first layer.

42. The composite construct of claim 41, wherein the first layer comprises a microwave energy interactive material, and the second layer comprises the first polymer.

43. The composite construct of claim 40, wherein the substrate comprises paperboard.

44. The composite construct of claim 33, wherein the sidewall comprises at least one corner, and the injection-molded element comprises at least one spline extending in the at least one corner.

45. The composite construct of claim 44, further comprising a rim extending from a top end of the sidewall, the injection-molded element comprises a band forming at least a portion of the rim, and the band of the injection-molded element is integrally formed with the at least one spline.

46. The composite construct of claim 33, further comprising a flange extending from the sidewall, the flange comprising the at least one laminate.

47. The composite construct of claim 46, wherein the injection-molded element comprises a structure extending around at least a portion of a perimeter of the composite construct along at least a portion of the flange.

48. The composite construct of claim 47, wherein the structure of the injection-molded element is secured to an underside of the flange adjacent an upper portion of the sidewall.

49. The composite construct of claim 33, further comprising a bottom wall and a flange, the side wall extending from the bottom wall to the flange.

50. The composite construct of claim 1, wherein the at least one injection-molded element engages at least a portion of the sidewall.

51. The composite construct of claim 1, wherein the at least one injection-molded element is at least partially secured to at least a portion of the sidewall.

52. The composite construct of claim 2, wherein the natural fibers of the plurality of natural fibers are distributed through at least a portion of the second renewable polymer.

53. The blank of claim 19, wherein the at least one injection-molded element is for being at least partially secured to at least a portion of the sidewall when the composite construct is formed from the blank.

54. The composite construct of claim 33, wherein the at least one injection-molded element engages at least a portion of the sidewall.

55. The composite construct of claim 33, wherein the at least one injection-molded element is at least partially secured to at least a portion of the sidewall.

* * * * *